July 16, 1940.  W. G. PETERS  2,208,051
DRIVE
Filed July 14, 1939  6 Sheets-Sheet 1

Inventor
William G. Peters
by Parker + Carter.
Attorneys.

July 16, 1940.  W. G. PETERS  2,208,051
DRIVE
Filed July 14, 1939  6 Sheets-Sheet 2
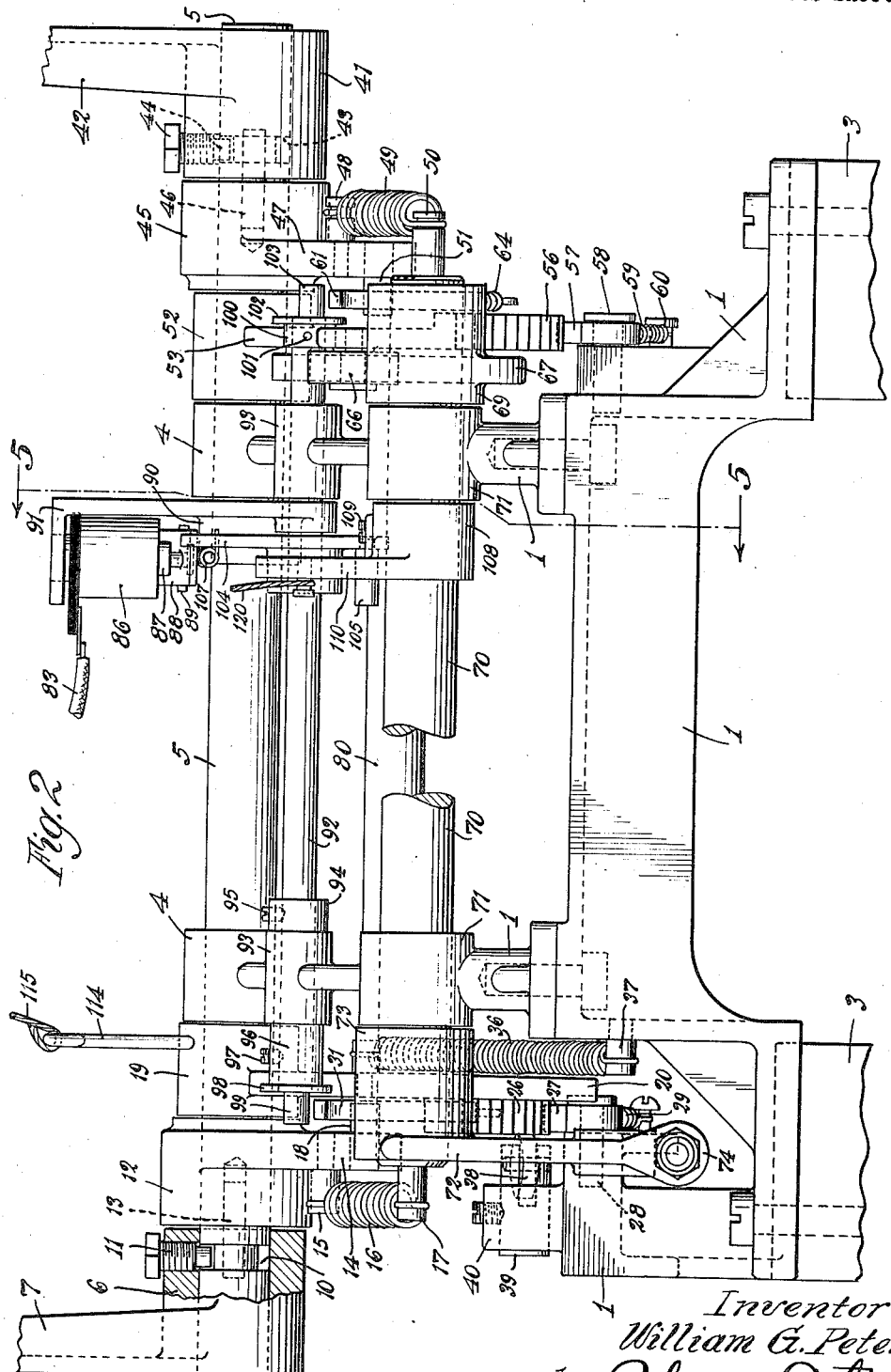
Inventor
William G. Peters
by Parker + Carter.
Attorneys.

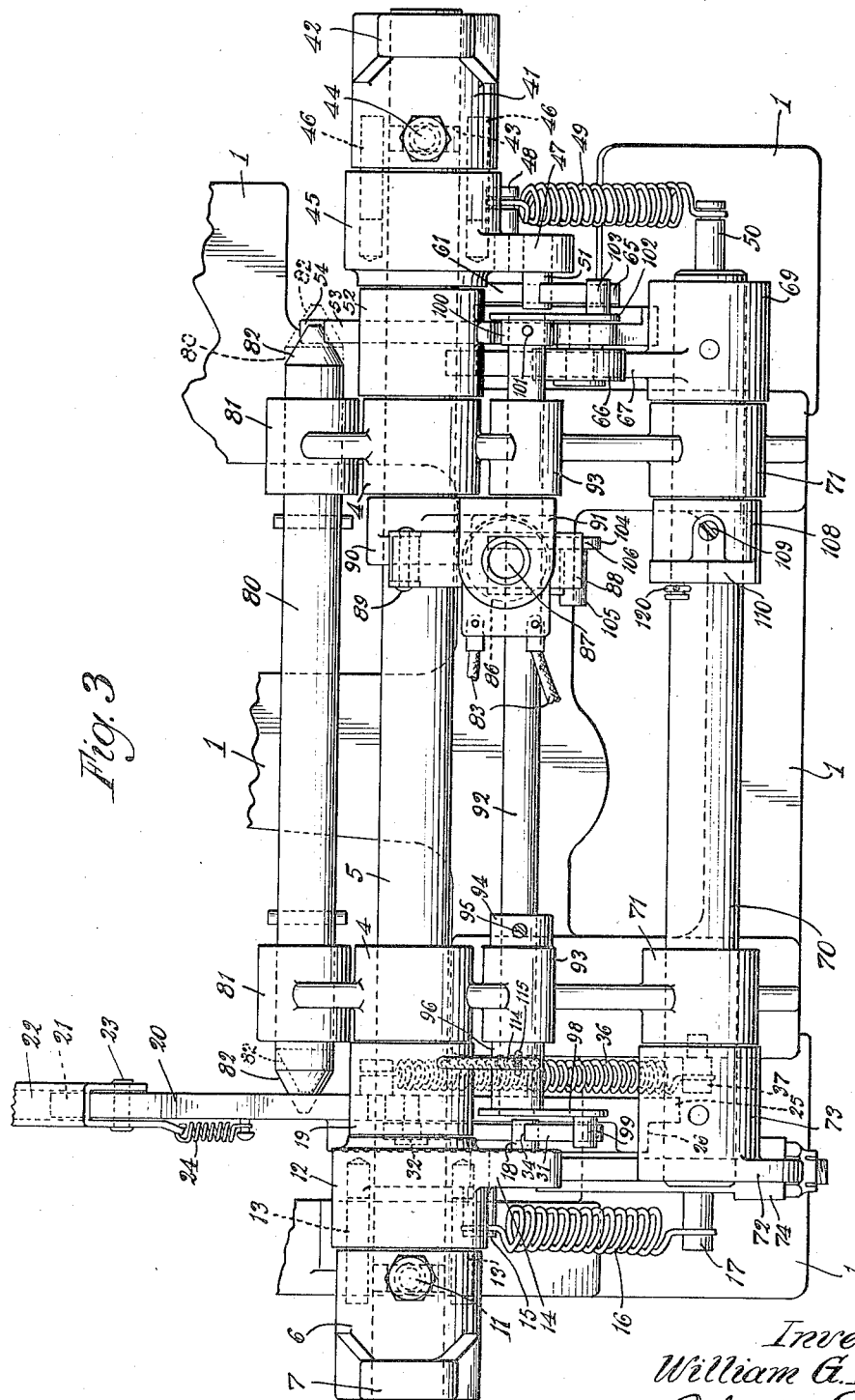

July 16, 1940.                W. G. PETERS                2,208,051
                                  DRIVE
                            Filed July 14, 1939            6 Sheets-Sheet 4
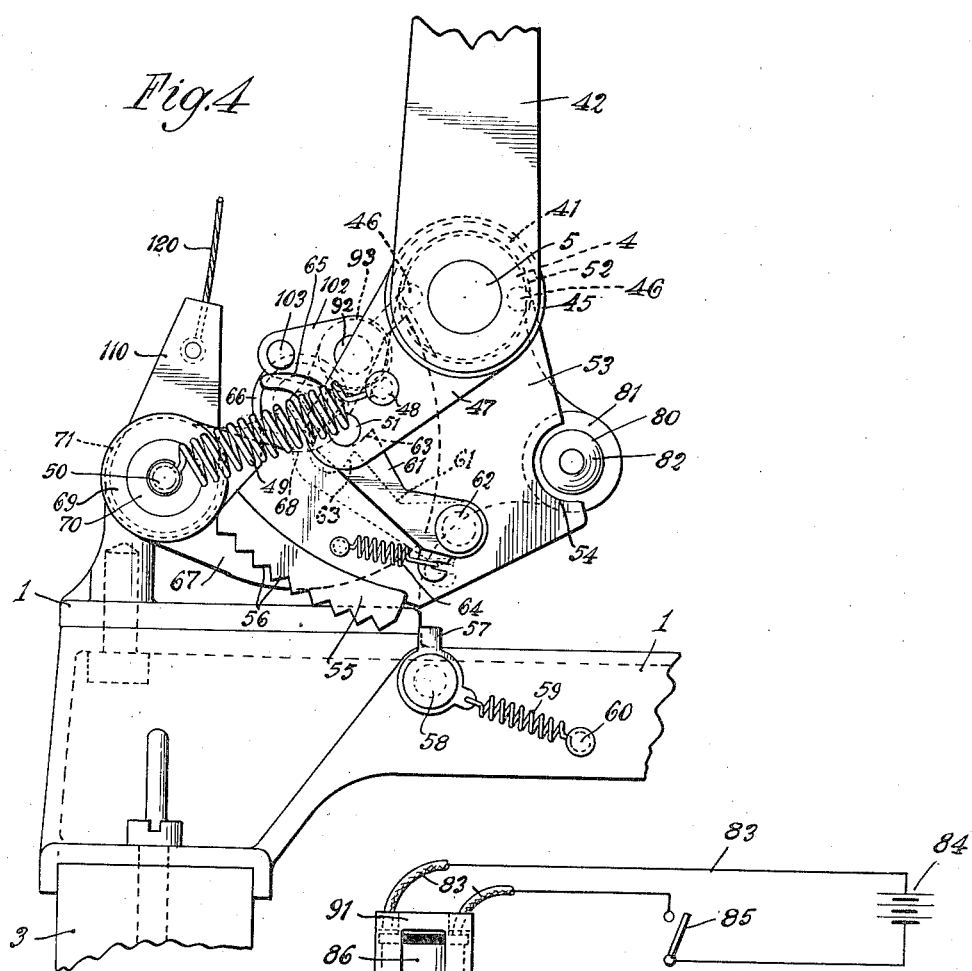
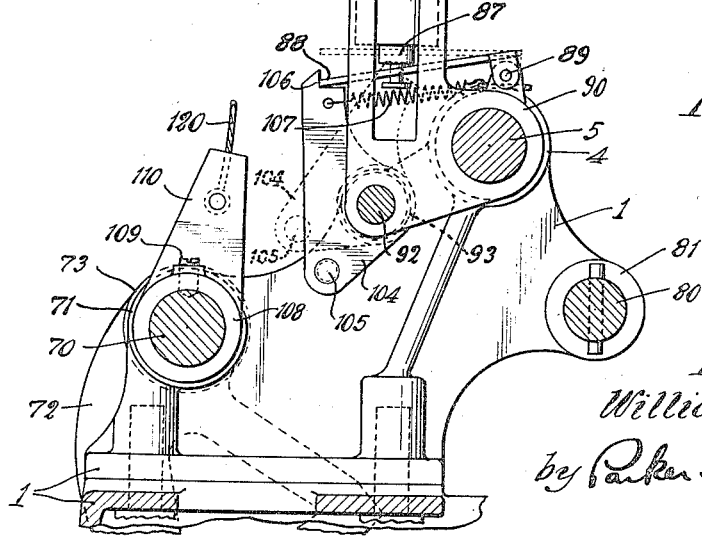
Inventor
William G. Peters
by Parker & Carter
Attorneys.

July 16, 1940.  W. G. PETERS  2,208,051
DRIVE
Filed July 14, 1939   6 Sheets-Sheet 5

Inventor
William G. Peters
by Parker & Carter
Attorneys.

July 16, 1940.  W. G. PETERS  2,208,051
DRIVE
Filed July 14, 1939  6 Sheets-Sheet 6

Inventor
William G. Peters
by Parker + Carter
Attorneys.

Patented July 16, 1940

2,208,051

UNITED STATES PATENT OFFICE 2,208,051

DRIVE

William G. Peters, Oak Park, Ill., assignor to Richard Groetchen, Chicago, Ill.

Application July 14, 1939, Serial No. 284,449

18 Claims. (Cl. 74—1)

This invention relates to a drive. In the particular form shown, it is primarily adapted for driving or operating an apparatus in which means are included for doing some sort of work or carrying out some sort of operation on a plurality of work pieces. Ordinarily, some means will be included for storing and moving the work pieces. Thus, the mechanism of the present invention provides a drive for doing the desired work and for moving the pieces upon which the work is to be done. Since it is not limited to any particular details of working mechanism or of piece storing and moving mechanisms, none is shown. One object of the invention is to provide a drive suitable for operating a machine in which at least two operations take place. Another object is to provide such a drive and to provide in connection with it means for insuring proper operation of the machine. A further object is to provide such a drive and means for automatically assuring that the two operations will occur in proper order. A further object is to provide means for insuring that two operations cannot simultaneously occur to cause unsatisfactory working or damage to the machine. A still further object is to provide a gauging or counting mechanism for use where the total number of operations is limited. In that case, the gauging means indicates the number of operations which has been performed or the number of times that operation has been performed, and it indicates, also, the number of times that the operation may still be performed in a given cycle. Thus, where the mechanism which is operated is a marking mechanism, coin controlled, and for each coin or for each work piece the mechanism may be operated a certain number of times only, a gauging mechanism indicates at the outset a total possible number of operations and indicates thereafter the number of operations that has been carried out and the number of remaining operations which can still be carried out.

Other objects will appear from time to time throughout the specification and the claims.

The invention is illustrated more or less diagrammatically in the accompanying drawings, wherein:

Figure 2 is a front elevation with parts broken away;

Figure 3 is a top plan view;

Figure 4 is a side elevation from the opposite side of the machine from that of Figure 1;

Figure 5 is a transverse vertical section taken at line 5—5 of Figure 2;

Like parts are designated by like characters throughout the specification and the drawings.

Figure 8:
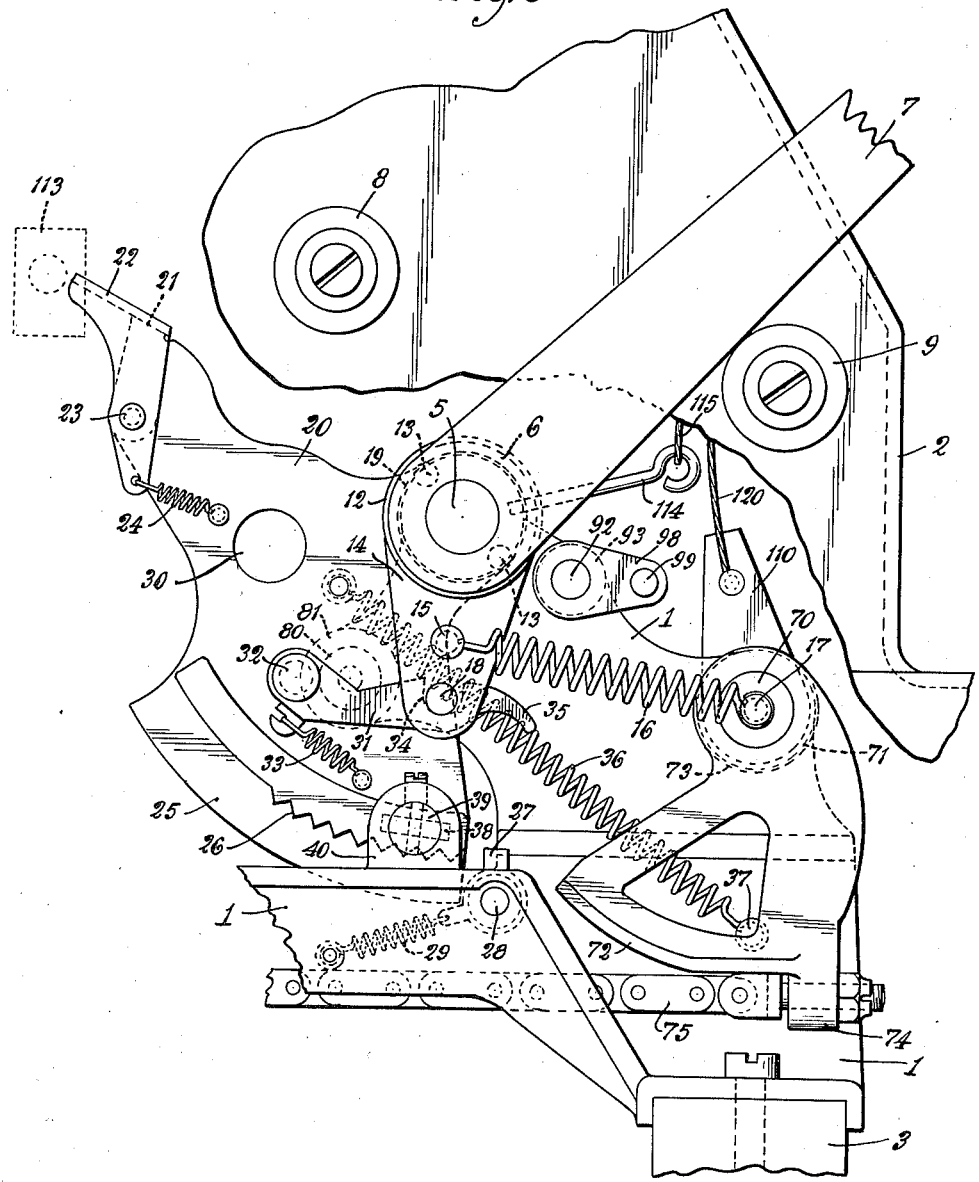
Figure 8 is a view similar to Figure 1, showing the parts in the operated position.

In general, the mechanism is assembled on any regularly shaped frame which may be cast integrally or otherwise made. The frame furnishes the support for the mechanism shown. In general, the mechanism may be assembled or enclosed in a housing. The frame parts are indicated throughout by the numeral 1. The housing is indicated by the numeral 2 and has generally been omitted from the structure. The frame may be supported upon base members 3, if desired. Carried in bearings 4, 4, suitably supported from the frame 1, is a shaft 5. Positioned at one end upon the shaft 5 is a hub 6, to which a handle 7 is secured. Stops 8 and 9, which may be mounted upon a suitable support such as the casing 2, limit the movement of the lever or handle 7. The shaft 5 is grooved as at 10 and the hub 6 overlies the groove. A pin or screw 11 in the hub 6 penetrates into the slot 10 and permits rotation of the hub and handle about the shaft. 12 is a hub mounted upon the shaft 5 and joined to the hub 6 by one or more pins 13. Projecting outwardly from the hub 12 is a relatively short lever arm 14. A pin 15 projects to one side of the lever 14; for example, to the left as shown in Figures 2 and 3; and one end of a spring 16 is secured to the pin 15. At its other end, the spring is secured to a fixed pin or abutment 17. The spring, when free to do so, holds the handle 7 and its associated parts in the upright position of Figure 1 but yields to permit their movement to the position of Figure 8. Projecting from the member 14 in the direction opposite to the pin 15 is a second pin 18.

Loosely mounted on the shaft 5 and adjacent the hub 12 and the bearing 4 is a hub 19 from which a plate-like member 20 extends. At one end, this member is flattened on its upper surface as at 21 and carries a lug 22 pivoted upon it as at 23 and normally held in the full line position of Figures 1 and 8 by a spring 24. Adjacent its lower edge, the member 20 may be arcuate as at 25 and may carry a pawl rack 26 which may be engaged by a pawl 27 pivoted as at 28 on the frame 1 and operated by a spring 29. The member 20 is perforated as at 30 to receive a locking member which will be described below. It also carries an engaging pawl 31 which is pivoted as at 32 upon the member 20 and is normally urged in counterclockwise direction by a spring 33. The pawl 31 is notched as at 34 and is provided with a curved upper surface 35, preferably between the notch 34 and its outer or free end. A spring 36 is secured to the member 20, preferably on the side opposite the rack 26 and the pawl 31. At its opposite end, the spring is secured to a pin or abutment 37 on some part of the frame structure 1. The spring 36 tends, when free to do so, to hold the member 20 and the parts which it carries in the position of Figure 1 but may yield to permit their movement to the position of Figure 8. A roller 38 is mounted in a forked member 39 which is adjustably secured in a seat member 40 formed preferably as a part of or attached to the frame structure 1. The roller bears against one face of the member 20 and resists side pressure on the latter which would tend to force it to the left from the position shown in Figure 2.

Figure 7:
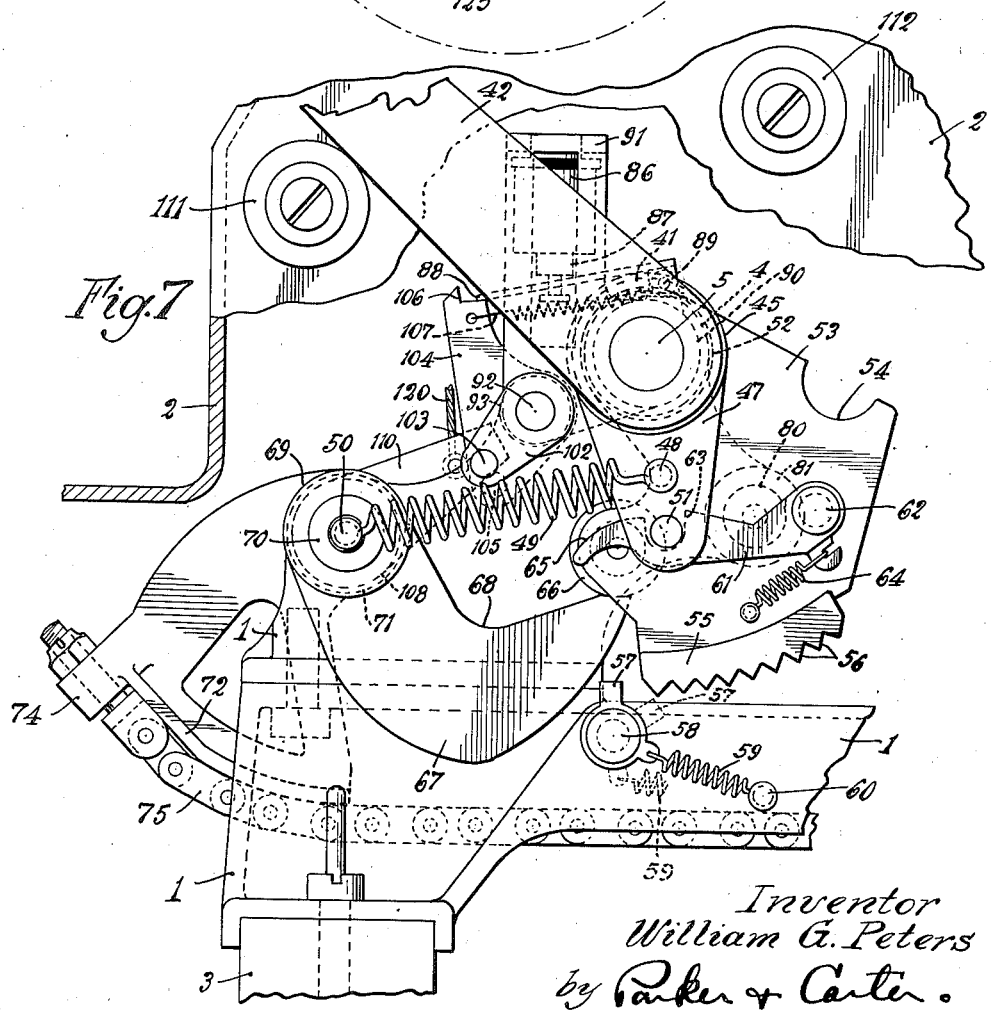
Figure 7 is a view showing the mechanism of Figure 4 with the parts in the operated position.

Loosely mounted on the shaft 5 at some point positioned away from the hub 6 is a hub 41. As here shown, it is on the opposite end of the shaft. A lever or handle 42 projects from it. The shaft 5 is grooved as at 43 and a pin 44 projecting inwardly into the hub 41 engages the groove. A hub 45 is loose upon the shaft 5 and is pinned by one or more pins 46 to the hub 41 so that the two move together. Projecting from the hub 45 is a lever member 47. At one side, the lever 47 carries a pin 48 to which one end of a spring 49 is secured. At its other end, the spring 49 is secured to a pin or other fixed abutment 50. On its opposite face, the lever member 47 carries a pin 51. Loosely mounted on the shaft 5 and preferably between the bearing 4 and the hub 45 is another hub 52. This hub has secured to it or formed integrally with it any regularly shaped member 53 which is notched as at 54 on one edge and is preferably arcuate along another edge 55. It may carry a ratchet rack 56 which is engaged by a pawl 57 pivoted at 58 upon the frame structure 1. A spring 59 secured at one end to the pawl 57 and at the other to the pin 60 on the frame structure 1 operates the pawl and tends to hold it in the upright position of the full lines of Figure 7 but permits it to move to the dotted line position of that figure.

Mounted, also, on the member 53 is a latching pawl 61 which is pivoted thereon as at 62. It carries a notch 63 and is operated by a spring 64 which tends to move it in clockwise direction. The pawl 61 preferably had adjacent its outer end a curved upper surface 65.

Pivotally mounted on the member 53 is a roller 66. This roller is adapted to operate the lever arm 67, preferably contacting an upper cam face 68 of that lever. The lever is itself secured to or formed as a part of a hub 69 which is secured to the shaft 70, this shaft being carried in bearings 71 formed as a part of or supported from the frame structure 1. At its opposite end, the shaft 70 has secured to it a quadrant 72 which is attached to or formed as a part of a hub 73. Secured as at 74 to the quadrant 72 is one end of a chain 75. At its opposite end, as shown particularly in Figure 1, the chain may be attached to a slide 76 moving in a guide-way 77. A pin 78 projects from the slide and receives one end of a spring 79. The spring yieldingly resists movement of the slide to the right of the position of Figure 1 and returns the slide to the position of that figure, when free to do so.

To prevent improper operation of the two handles and, particularly, to prevent simultaneous operation of these two handles, a latch bar 80 is slidably mounted in supports 81 formed as a part of or secured to the frame structure 1. The latch bar, as shown, is provided with pointed ends 82 and it is of such length that it is contacted by the notch 54 of the member 53 and by the perforation 30 of the member 20. If one of these members is moved at a time, the pointed end acting as a cam is moved out of the path of the member which is in motion. If both are moved at once, the latch bar projects into the path of each end prevents movement of either. After one of the members 20 or 53 has been moved sufficiently so that either the notch 54 or the perforation 30 has cleared the adjacent end of the latch bar 80, movement of the opposite handle then cannot cause sliding movement of the latch bar because its end abuts against the flat surface of the member 53 or the member 20. Consequently, this latch bar prevents simultaneous operation of the two handles and as soon as one handle has moved a relatively short distance, it prevents any movement of the other handle.

In order to control the operation of the mechanism, a further latching assembly is provided. If the machine is to operate under coin control, this latching mechanism will be so arranged. It may, however, operate under any control such as a mere manual control of a controlling lever. As shown, the latching mechanism includes members 83 defining an electrical circuit, a source of current 84, a switch 85 and a solenoid or other suitable magnet 86. A member 87 is positioned to be moved by the solenoid, engages at one end a latching lever 88 which is itself pivoted as at 89 on some part supported from the frame structure 1. Here shown, it is an abutment or base 90. The solenoid is itself mounted upon a support 91 although it might be carried in any other suitable manner. A latching or latch controlling shaft 92 is mounted in bearings 93, supported from or formed as a part of the frame structure 1. A positioning collar 94 may be pinned to the shaft by a pin 95 and the shaft may carry a second positioning collar 96 held in place by a pin or a screw 97. Upon the collar 96 is mounted a lever 98 from which a pin 99 projects laterally into the path of the pawl 31. At its opposite end, the shaft 92 carries a collar 100 which may be held in place by a pin or screw 101. From the collar 100 projects a lever 102 from which extends a pin 103 which projects into the path of the pawl 61. The levers 98 and 102 are so positioned on the shaft 92 that the pins 99 and 103 are co-axial and move together and equally with movements of the shaft 92. Fixed on the shaft 92 is a latching lever 104 which carries a laterally projecting pin 105. Elsewhere, the lever 104 is notched at 106 to engage the latching lever 88. A spring 107 is secured at one end to the lever 104 and at its opposite end to a fixed abutment, preferably adjacent the point 89. When the parts are latched, they occupy the full line position of Figure 5. When the solenoid is actuated, the pin 87 is raised, the latching lever 88 is carried upwardly with it to the dotted line position of that figure and the spring 107 is then free to move the lever 104 to the dotted line position of Figure 5. Since the lever is secured to the shaft 92, this gives to the shaft a clock-wise rotation as shown in Figure 5 and, thus, raises the pins 99 and 103 to the positions shown, for example, in Figures 2 and 4 in which they are moved either out of contact with the pawls 31 and 61 or, else, are merely raised sufficiently to permit the pawls to be themselves raised by their respective springs 33 and 64 into the position in which the notches 34 and 63, respectively, engage the pins 18 and 51 so that movement of the handles 7 or 42 is effective, respectively, to rotate the members 20 or 53 and the parts associated with them.

Figure 1:
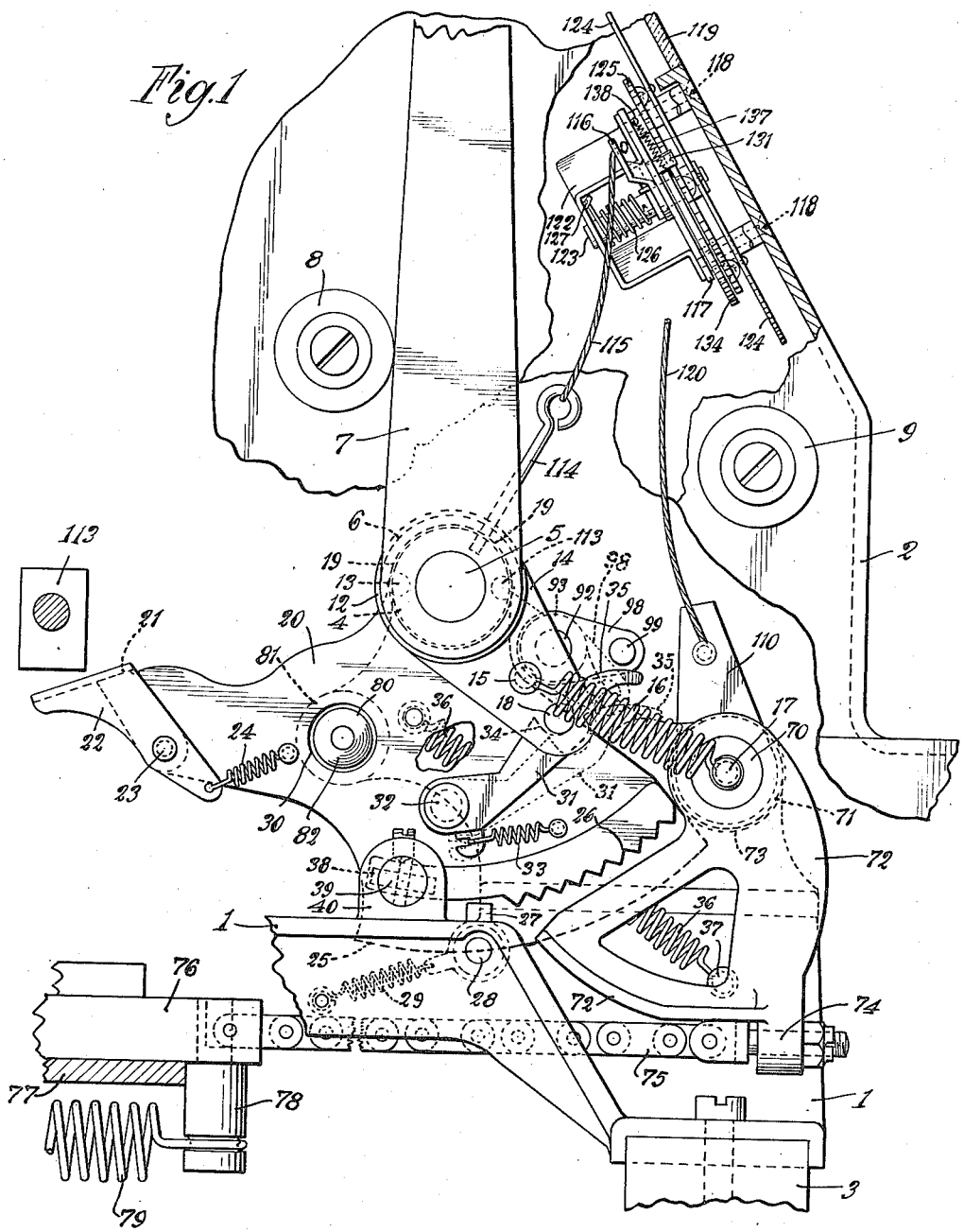
Figure 1 is a side elevation with parts in section and parts broken away, showing one side of the mechanism.

A latch reset mechanism is provided on shaft 70. It includes a hub 108 fixed to the shaft by a set screw 109. Projecting upwardly from the hub is a reset lever 110. After the parts have been unlatched and the latching lever 104 has moved to the dotted line position of Figure 5, if the handle 42 is operated, it is moved to the position of Figure 7, its movement in that direction being limited by a stop 111 mounted on the housing or casing 2. Its movement in the opposite direction is limited by a stop 112 similarly mounted on the casing 2. When the handle is moved, thus, to the position of Figure 7, the shaft 70 is moved from the position of Figure 5 in a clockwise direction by means of the lever 66 and other associated parts and carries the lever 110 into contact with the pin 105 which projects laterally from the latching lever 104. This movement is of sufficient extent to restore the lever 104 to the full line position of Figure 5 and if the solenoid is deenergized at that time, the member 88 fits into the notch 106 and is held in place by the spring 107. This movement of the lever 104 under the influence of the lever 110 rotates the shaft 92 in a counterclockwise direction as shown in Figure 5, and, consequently, depresses the levers 98 and 102 and brings their respective pins 99 and 103 into contact, respectively, with the latching pawls 31 and 61 and moves them downwardlly to the dotted line position of each, as shown in Figures 1 and 4, and, thus, holds them out of the path of the pins 18 and 51. When the pawls 31 and 61 are, thus, held downwardly, movement of either of the handles 7 or 42 merely permits idler movement of these parts and the levers 14 and 47 about the shaft 5 but does not cause any further operation of the mechanism. Thus, the latching mechanism shown in details in Figure 5, when it is in the latched position, permits movements of the handles but latches the mechanism out of operative connection. When the latching mechanism is operated to permit movement of the lever 104 to the dotted line position, then the linkage is moved to operative position and thereafter movement of either of the handles 7 or 42 will cause movement of the mechanism.

If, as above suggested, movement of the handle 7 actuates a working mechanism, it may, for example, be arranged to actuate a hammer. Such a hammer is indicated diagrammatically at 113 in Figure 1. Thus, when the parts are unlatched and ready for operation, movement of the handle 7 in the clockwise direction causes raising of the member 20 and the pivoted nose 22 contacts the hammer 113 and raises it. When the movement continues to the extent permitted by the limit stop 9, the hammer 113 will drop off the nose of the member 20 and the hammer will then fall to accomplish the work desired. After the hammer has been raised and permitted to fall the desired number of times, the handle 42 will be operated and through its associated parts will move the slide 76 to move the work piece from beneath the hammer 113. As above described in connection with the detailed description of Figure 5, when the latching member 88 has been moved out of engagement in the notch 106 and the latching member 104 has moved to the dotted line position, it will remain in that position and the parts will be unlatched and in suitable position for operation until the handle 42 has been once moved throughout the limit of its excursion. That movement rotates the reset lever 110 and resets the latching lever 104 and the latch member 88. Thus, the parts, after the desired number of movements of the handle 7, will have carried out the desired work on the work piece; a single movement of the handle 42 will have moved the slide 76 to eject the work piece to bring another work piece into position under the hammer 113 and to reset the latching mechanism of Figure 5 so that the parts will be held out of operation until that latching mechanism is again tripped or unlatched by actuation of the solenoid, or otherwise. Where the mechanism is coin controlled, the solenoid circuit will be completed and the solenoid actuated by the passage or insertion of a coin or token. As here shown, the circuit is completed by movement of the switch 85. Obviously, a purely mechanical means might be provided, whether coin controlled or not, for moving the member 88 out of latching position.

Frequently, the work piece upon which the mechanism is arranged to act is of a limited size and, consequently, only a limited number of operations can be carried out upon it. Sometimes, for other reasons, it is desirable to limit the number of operations effected upon the work piece and, for that reason, a gauging mechanism may be used, as shown in section in Figure 1 and in plan with parts omitted in Figure 6. If it be assumed that there are 32 possible operations or that a simple operation may be repeated a maximum of 32 times, the dial as shown will be marked from 1 to 32. One machine to which the structure of the present invention may be applied might contemplate the giving of a maximum of 32 hammer blows on each work piece. Hence, the dial is to be moved each time the member 20 is moved to raise the hammer 113. The outer row of numbers, starting at zero, indicates that at the time of starting no operation has been performed—the hammer has not fallen up to that time. The inner row of numbers indicates that it still has 32 operations which it may perform. After it has been raised and dropped once, the dial moves counterclockwise and the numbers 1 and 31 are brought into view through a suitable opening, indicating that the hammer has fallen once and that it still may be caused to fall 31 additional times.

To operate the dial or gauging mechanism, a pin or projection 114 is mounted in the hub 19 and a connection which here takes the form of a cord or wire 115 is made to a lever 116 which forms a part of the counter or gauge. This counter assembly includes a frame 117 which is secured by screws 118 or otherwise to the housing 2 in position so that one number of the outer row and one number of the inner row are visible through a window 119 suitably positioned in the housing. A connection member 120 is secured at one end to the reset member 110 and at the other to the reset lever 121 of the counter. An additional frame or housing portion 122 is secured to the frame 117 and houses and furnishes a bearing for the dial shaft 123 to which the dial 124 and the ratchet wheel 125 are secured. A spring 126, which is anchored at one end upon the shaft 123 and at its other end at 127 on the frame member 122, yieldably resists rotation of the shaft in the counterclockwise direction and, when free to do so, by rotating the shaft in clockwise direction restores it to its original position which is determined by a pin 128 formed preferably on the frame member 117 and by a stop projection 129 which may be secured to or punched out from the ratchet wheel 125.

The frame plate 117 is slotted as at 130 and through this slot a tooth or dog 131 extends. It is formed on the operating lever 116 which is itself pivoted about the shaft 123. A spring 132 is secured at one end to the lever 116 and at its other end to a pin or abutment 133 formed on a spring plate 117. It tends yieldably to hold the lever 116 in the position of Figure 6 but permits it to be rotated downwardly by the connecting member 115. A cooperating lever member 134 is partially arcuate in shape and is pivoted to the frame member 117 as at 135. It carries a raised lug 136 and at its free end has one end of a spring 137 secured to it. The opposite end of this spring is secured to a pin or abutment 138 mounted on the frame plate 117. The lever 134 lying above the frame plate 117 partially over-lies the slot 130 and lies in the path of the tooth or dog 131. Downward movement of the latter causes downward or counterclockwise rotation of the lever 134 against the yielding resistance of its spring 137.

The reset lever 121 is pivoted as at 139 on the frame plate 117. This plate is slotted as at 140 and a tooth or lug 141, formed as a part of the lever 121, projects through the slot 140.

Figure 6:
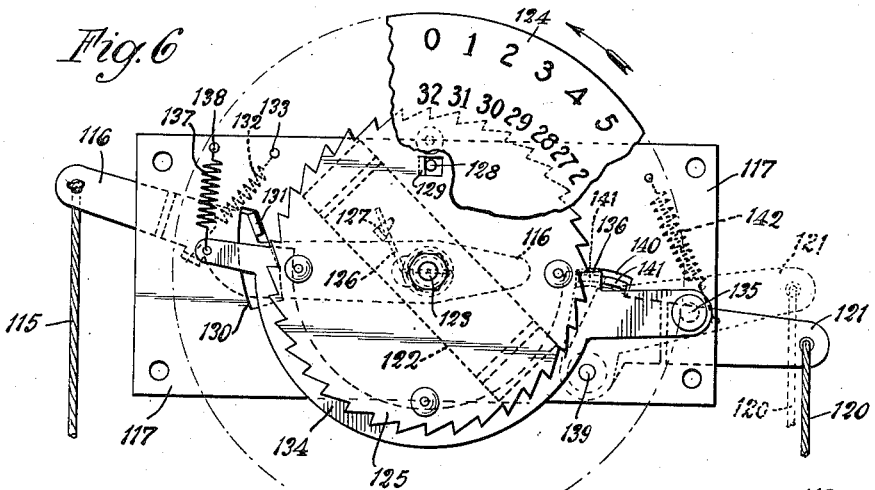
Figure 6 is a front view of the gauging mechanism with parts broken away.

The parts of the counter mechanism are in position for operation as shown in Figure 6. In that position, the tooth 141 of the reset lever 121 lies behind the raised lug 136 of the lever 134. When now the handle 7 is operated by being moved in clockwise direction from the position of Figure 1, the connection member 115 is pulled downwardly. The lever 116 is moved downwardly. The tooth 131 engages one of the teeth of the ratchet wheel 125 and rotates it one notch in the counterclockwise direction, bringing the numbers 1 and 31 into the position beneath the window 119 which was occupied by the numbers zero and 32. As this movement occurs, the tooth 131 contacts the adjacent part of the lever 134 and moves it downwardly. Thereupon the reset lever 121 is moved by its spring 142 into the dotted line position of Figure 6, the tooth or member 141 of the lever 121 riding over the lug 136 of the member 134 and into engagement with one of the teeth of the ratchet 125. Thereafter, the lever 134 is held in a depressed position by the lug 141 and the lever 121, together with the lever 134, moves slightly as each successive ratchet tooth is moved past them in the counterclockwise direction by further movements of the lever 116.

When the dial 124 and the ratchet 125 have been moved through their full excursion so that the work upon the work piece has been completed, the handle 42 is rotated and through the member 110 and connection 120 the reset lever 121 is restored to the full line position of Figure 6. It is, thus, moved out of engagement with the ratchet teeth and the ratchet and dial are freed for return or clockwise movement under the influence of the spring 126. When that movement has been completed and the stop 129 brought into engagement with the pin 129, the parts resume the position shown in Figure 6 in which the tooth 140 of the reset lever 121 lies behind the tooth 136 of the lever 134 and is by it held out of engagement with the ratchet teeth.

I claim:

1. In combination in an operating mechanism arranged to perform two operations, a shaft, a pair of handles, pivotal supports therefor, a pair of driving members freely mounted one adjacent each of said handles, operating levers secured one to each of said handles, said driving members normally being disconnected from said operating levers, and connecting means positioned partly on said driving members and partly on said operating levers for connecting together the driving member and the operating lever of each pair to cause them to move in unison in response to movement of the respective handle.

2. In combination in an operating mechanism arranged to perform two operations, a shaft, a pair of handles, pivotal supports therefor, a pair of driving members freely mounted one adjacent each of said handles, operating levers secured one to each of said handles, said driving members normally being disconnected from said operating levers, and connecting means positioned partly on said driving members and partly on said operating levers for connecting together the driving member and the operating lever of each pair to cause them to move in unison in response to movement of the respective handle, and a control member adapted to be movably contacted by each driving member, and of such length that it prevents simultaneous operation of the said driving member.

3. In combination in an operating mechanism arranged to perform two operations, a shaft, a pair of handles, pivotal supports therefor, a pair of driving members freely mounted one adjacent each of said handles, operating levers secured one to each of said handles, said driving members normally being disconnected from said operating levers, and connecting means positioned partly on said driving members and partly on said operating levers for connecting together the driving member and the operating lever of each pair to cause them to move in unison in response to movement of the respective handle, and a control member positioned between said driving members and adapted to be movably contacted by each driving member, and of such length that it prevents simultaneous operation of the said driving member.

4. In combination in an operating mechanism arranged to perform two operations, a shaft, a pair of handles, pivotal supports therefor, a pair of driving members freely mounted one adjacent each of said handles, operating levers secured one to each of said handles, said driving members normally being disconnected from said operating levers, and connecting means positioned partly on said driving members and partly on said operating levers for connecting together the driving member and the operating lever of each pair to cause them to move in unison in response to movement of the respective handle, and a latching means adapted in one position to latch said connections out of operation and, in another position, to free them for operation.

5. In combination in an operating mechanism arranged to perform two operations, a shaft, a pair of handles, pivotal supports therefor, a pair of driving members freely mounted one adjacent each of said handles, operating levers secured one to each of said handles, said driving members normally being disconnected from said operating levers, and connecting means positioned partly on said driving members and partly on said operating levers for connecting together the driving member and the operating lever of each pair to cause them to move in unison in response to movement of the respective handle, and a single latching means adapted in one position to latch said connections out of operation and, in another position, to free them for operation.

6. In combination in an operating mechanism arranged to perform two operations, a shaft, a pair of handles, pivotal supports therefor, a pair of driving members freely mounted one adjacent each of said handles, operating levers secured one to each of said handles, said driving members normally being disconnected from said operating levers, and connecting means positioned partly on said driving members and partly on said operating levers for connecting together the driving member and the operating lever of each pair to cause them to move in unison in response to movement of the respective handle, and a single latching means adapted in one position to latch said connections out of operation and, in another position, to free them for operation, and a control member positioned between said driving members and adapted to be movably contacted by each driving member, and of such length that it prevents simultaneous operation of the said driving member.

7. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and means for latching both of said engaging parts out of operative position.

8. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and means for latching both of said engaging parts out of operative position, means for holding said latching means in latching position, and yielding means adapted to move said latching means out of operating position to free said engaging parts for engagement, each with its respective projection.

9. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and means for latching both of said engaging parts out of operative position, and a control member adapted to prevent simultaneous movement of said operating quadrant members.

10. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and means for latching both of said engaging parts out of operative position, and a control member adapted to prevent simultaneous movement of said operating quadrant members, said control member comprising a slidably mounted part, said part being positioned intermediate said operating members, the turning movement of either of said operating members being effective to move said control member into locking position with respect to the other control member and to prevent its movement.

11. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and means for latching both of said engaging parts out of operative position, means for holding said latching means in latching position, and yielding means adapted to move said latching means out of operating position to free said engaging parts for engagement, each with its respective projection, and a control member adapted to prevent simultaneous movement of said operating quadrant members.

12. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and means for latching both of said engaging parts out of operative position, means for holding said latching means in latching position, and yielding means adapted to move said latching means out of operating position to free said engaging parts for engagement, each with its respective projection, and a control member adapted to prevent simultaneous movement of said operating quadrant members, said control member comprising a slidably mounted part, said part being positioned intermediate said operating members, the turning movement of either of said operating members being effective to move said central member into locking position with respect to the other control member and to prevent its movement.

13. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, means for urging each engaging part into engagement with its projection, and means for latching both of said engaging parts out of operative position.

14. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, means for yieldably urging each engaging part into engagement with its projection, and means for latching both of said engaging parts out of operative position.

15. In an operating assembly for performing two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and unitary means for latching both of said engaging parts out of operative position.

16. In an operating assembly for performing separately two operations, a plurality of driving sub-assemblies, each sub-assembly including a handle, a pivotal support therefor, and means for releasably securing each handle to an operating member, said means including a projection on one and an engaging part on the other, and means for latching both of said engaging parts out of operative position.

17. In an operating assembly for performing separately two operations, a plurality of driving sub-assemblies, each sub-assembly including a handle, a pivotal support therefor, an operating member and a pivotal support therefor, and means for releasably securing each handle to an operating member, said means including a projection on one and an engaging part on the other, and unitary means for latching both of said engaging parts out of operative position, and a control member adapted to prevent simultaneous movement of said operating quadrant members.

18. In an operating assembly for performing separately two operations, a plurality of driving sub-assemblies, each sub-assembly including a handle, a pivotal support therefor, an operating quadrant member and a pivotal support therefor, and means for releasably securing each handle to an operating quadrant member, said means including a projection on one and an engaging part on the other, means for yieldably urging each engaging part into engagement with its projection, and unitary means for latching both of said engaging parts out of operative position, means for holding said latching means in latching position, and yielding means adapted to move said latching means out of operating position to free said engaging parts for engagement, each with its respective projection, and a control member adapted to prevent simultaneous movement of said operating quadrant members, said control member comprising a slidably mounted part, said part being positioned intermediate said operating members, the turning movement of either of said operating members being effective to move said control member into locking position with respect to the other control member and to prevent its movement.

WILLIAM G. PETERS.